Figure 1:
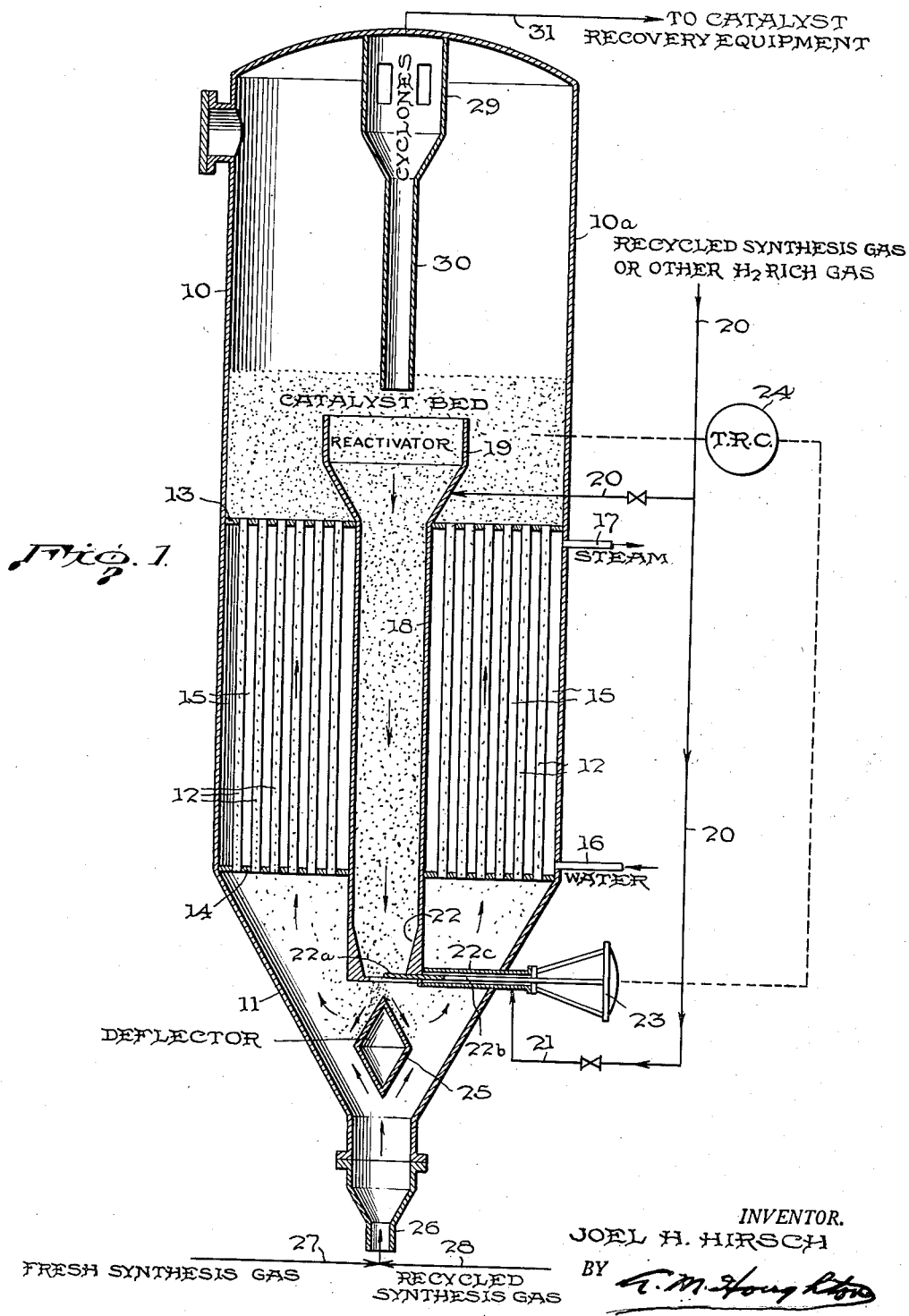

Nov. 15, 1949     J. H. HIRSCH     2,488,406
METHOD AND APPARATUS FOR CONDUCTING
CHEMICAL REACTIONS

Filed Nov. 25, 1947     2 Sheets-Sheet 1

INVENTOR.
JOEL H. HIRSCH
BY G. M. Houghton
his ATTORNEY

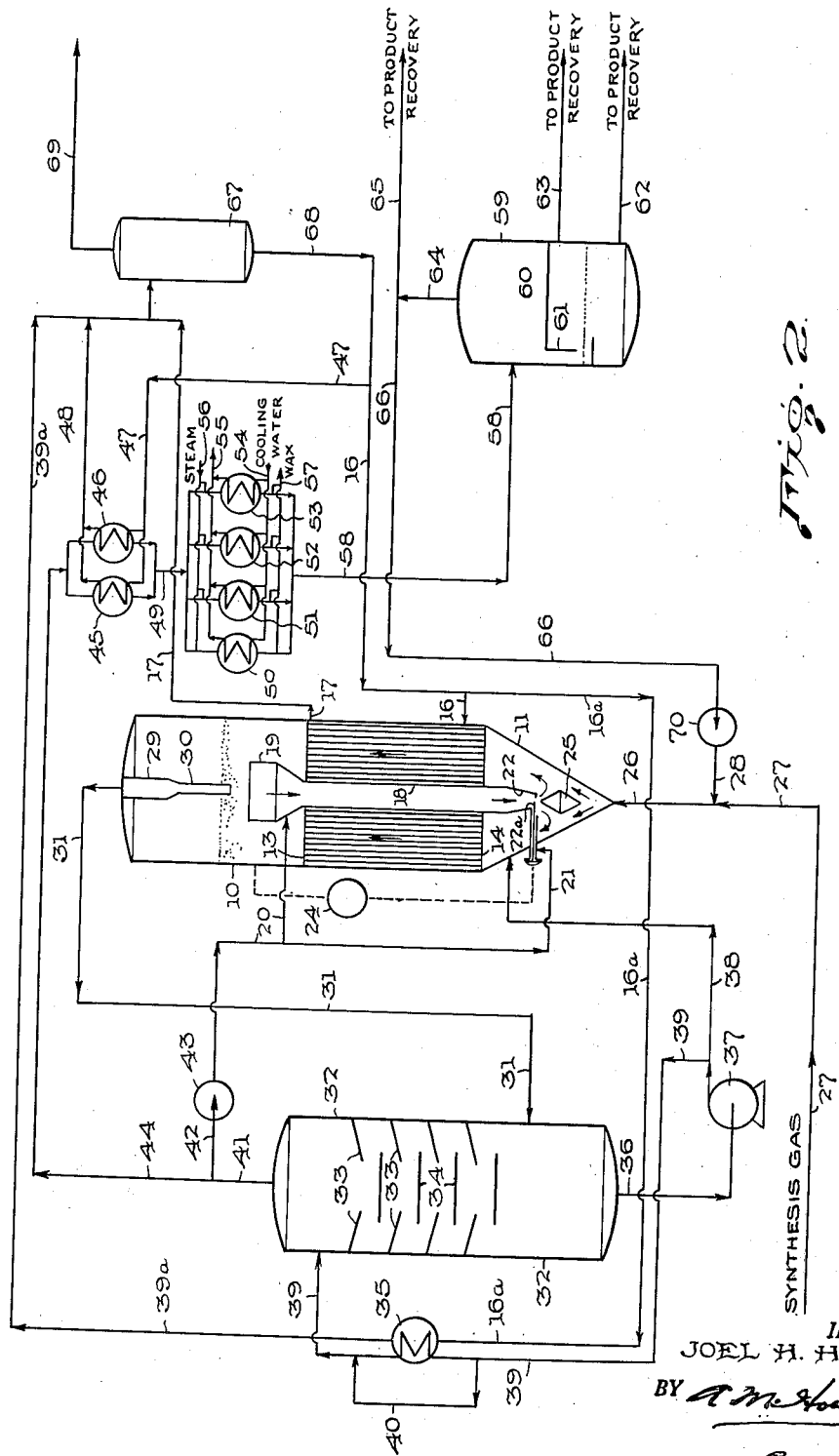

Patented Nov. 15, 1949

2,488,406

UNITED STATES PATENT OFFICE 2,488,406

METHOD AND APPARATUS FOR CONDUCTING CHEMICAL REACTIONS

Joel H. Hirsch, Oakmont, Pa., assignor to Gulf Research & Development Company, Pittsburgh, Pa., a corporation of Delaware Application November 25, 1947, Serial No. 787,884

4 Claims. (Cl. 260—449.6)

This invention relates to a method and apparatus for conducting chemical reactions. More particularly, it is concerned with a method and apparatus for conducting chemical reactions wherein a finely divided, powdered catalyst is maintained in suspension in reactant gases in a dense fluidized bed in a reaction zone.

In conducting exothermic chemical reactions in the presence of a powdered catalyst, considerable difficulty has been encountered in satisfactorily removing the exothermic heat of reaction from the catalyst, particularly in large scale operations. If the exothermic heat of reaction is not removed, it is difficult, if not impossible, to control the reaction temperature and to keep the reaction under control. This is particularly true in the synthesis of hydrocarbons from hydrogen and carbon monoxide in the presence of a synthesis catalyst, such as iron, cobalt or nickel. The products obtained from this synthesis vary considerably, depending on the temperature of the reaction. Thus, if it is desired to obtain gasoline hydrocarbons, it is important that the reaction temperature be kept within desired limits, otherwise normally gaseous hydrocarbons instead of gasoline hydrocarbons are the primary products, and the catalyst may be rendered inactive.

It has been recognized in the art that one of the difficulties involved in satisfactory removal of the exothermic heat of reaction resides in the fact that heat transfer rates from the solid catalyst particles to the surrounding gaseous medium are slow. To overcome this it has been proposed, among other expedients, to suspend a powdered catalyst in the reactant gases to form a dense fluidized bed of catalyst in a turbulent state resembling a boiling liquid in order to obtain better heat transfer between the catalyst and the gaseous medium flowing through the catalyst bed. However, the degree of control of the exothermic heat of reaction thus achieved is not entirely successful.

Somewhat similar problems are encountered in endothermic catalytic reactions, except in this instance it is necessary to supply heat to the catalyst particles.

It is an object of this invention, therefore, to provide a method and apparatus for conducting exothermic and endothermic chemical reactions wherein a fluidized powdered catalyst is employed, and wherein the heat of reaction is satisfactorily controlled.

It is a further object of this invention to provide a method and apparatus for the synthesis of hydrocarbons from carbon monoxide and hydrogen wherein removal of the heat of reaction and control of the reaction temperature are successfully accomplished. Other objects will appear hereinafter.

These objects are achieved by the present invention wherein a powdered catalyst is maintained in suspension in reactant gases in a dense fluidized bed in a reaction zone, gaseous and vaporous reaction products are withdrawn from the reaction zone, a dense stream of fluidized catalyst is downwardly withdrawn from the reaction zone and commingled with reactant gases in a mixing zone to form a dilute stream of fluidized catalyst, the resulting mixture is then passed upwardly through a heat transfer zone, i. e., a cooling or heating zone, into the reaction zone wherein the dense fluidized bed of catalyst is formed again, and the temperature in the reaction zone is controlled by controlling the amount of catalyst flowing through the cooling or heating zone.

More particularly, in an exothermic chemical reaction employing a powdered catalyst in a dense fluidized bed, the exothermic heat of reaction can be readily removed, and thereby the reaction temperature can be readily controlled, by continuously removing a portion of the dense fluidized catalyst downwardly from the catalyst bed into a mixing zone where it is diluted and made less dense by the addition of more reactant gases; and the less dense stream of catalyst is then passed upwardly through a cooling zone back into the reaction zone where the dense catalyst bed is formed again. By controlling the amount of catalyst which is withdrawn from the catalyst bed, cooled and then mixed with the catalyst bed, I am able to achieve a satisfactory removal of the exothermic heat of reaction and I am able thereby to maintain the desired reaction temperature in the reaction zone. Cooling of the catalyst stream is readily accomplished when it is in the less dense phase resulting from the mixing of the dense phase with additional reactant gases.

It should be understood that as used in this specification and in the appended claims, the terms "dense fluidized catalyst," "dense fluidized bed," "dense stream of fluidized catalyst," "dense phase" and similar terms refer to a suspension of the powdered catalyst in the reactant gases which behaves like a liquid. On the contrary, the terms "less dense fluidized catalyst," "dilute fluidized catalyst," "less dense phase" and similar terms refer to the diluted suspension of the powdered catalyst in the gases after leaving the mixing zone; this dilute suspension behaves more like a gas, and the catalyst particles are carried along in the stream of gas. The density of the fluidized catalyst will vary with the linear velocity of the suspending gases, the particle size and density of the catalyst, as will be understood by those skilled in the art. By way of example, finely divided iron catalyst for use in the synthesis of hydrocarbons from carbon monoxide and hydrogen, having a bulk density in the settled state of 128 pounds per cubic foot and a particle size of 65-140 mesh will form a "dense" fluidized phase of from 100 to 60 pounds per cubic foot with a linear gas velocity of from 0.6 to 2.2 feet per second. The same catalyst will form a "dilute" or "less dense" fluidized phase of from about 15 to about 5 pounds per cubic foot with a linear gas velocity of 10 to 20 feet per second.

The density of the catalyst-gas mixture in the dilute phase may be calculated from the following equations:

$$\rho c = \frac{W}{AV_c} \quad (1)$$

$$V_c = V - V_t \quad (2)$$

$$V_t = 3.2\sqrt{\frac{d\rho_s}{\rho}} \quad (3)$$

where $\rho c$ = density of the catalyst-gas mixture, pounds per cubic foot.
$A$ = cross section of carrying line, square feet.
$W$ = catalyst flow rate, pounds per second.
$V_c$ = net catalyst velocity relative to tube wall, feet per second.
$V$ = gas velocity, feet per second.
$V_t$ = velocity at which catalyst tends to settle in an upward moving gas stream, feet per second.
$d$ = catalyst mean particle diameter, inches.
$\rho_s$ = particle density, pounds per cubic foot.
$\rho$ = gas density, pounds per cubic foot.

In order that my invention may be more fully understood, there is described with reference to the attached drawings, the synthesis of hydrocarbons from carbon monoxide and hydrogen in the presence of a powdered synthesis catalyst.

In the drawings, Figure 1 shows, more or less diagrammatically, a vertical sectional view through one embodiment of the reactor section of an apparatus in accordance with my invention.

Figure 2 shows diagrammatically the reactor of Figure 1 in relationship to other units including the catalyst recovery system.

In the drawings, 10a represents the shell of a cylindrical vessel 10 provided with a conical bottom 11. The angle of the cone is 60° or more. Within the reactor and extending from wall to wall thereof is a cooler formed of tube sheets 13 and 14 in which are mounted cooling tubes 12. An inlet 16 and an outlet 17 for cooling medium communicate with the shell of the cooler 15 which is identical with the shell of the vessel 10a. Within the vessel 10 and also mounted in the tube sheets 13 and 14 is a standpipe 18 extending somewhat below tube sheet 14 into the conical portion 11 of the vessel 10. The standpipe is preferably coaxial with the vessel 10. Attached to the standpipe 18 and extending upwardly into the reaction zone or catalyst bed from the tube sheet 13 is a catalyst reactivator 19 consisting of a cylinder and truncated cone coaxial with the standpipe 18. Conduit 20 communicates with the interior of reactivator 19 and supplies a reactivating gas thereto. At the bottom of the standpipe 18, there is provided a slide valve which consists of a cylindrical throat 22 and a flat plate or gate 22a of erosion-resisting metal. These parts are so arranged that movement of the plate 22a across the throat is capable of completely stopping flow of catalyst, giving the maximum flow desired with the standpipe head available, or giving any degree of flow between zero and the desired maximum. The movement of plate 22a is actuated by any known means, such as by a linkage 22b attached to a diaphragm 23 which is pneumatically operated by temperature controller 24, which in turn is responsive to a thermocouple in the catalyst bed. While I have described the control of the slide valve by pneumatic means, it may be controlled by other known means, such as hydraulically or electrically.

A conduit 21 communicates with the casting 22c of the slide valve and thence with the interior of the standpipe 18 and supplies an aerating gas to the interior of the standpipe for maintaining the catalyst therein in fluidized condition. Below the slide valve, there is mounted in the conical portion 11 of the vessel 10 a deflector 25 which may consist of two cones welded together at their bases, with the apices of the cones coaxial with the vertical axis of the vessel 10. The deflector 25 serves the purpose of directing the incoming synthesis gas from conduit 26 away from the slide valve and into the stream of catalyst issuing from the standpipe 18. The zone in the conical bottom 11 surrounding the deflector 25 is a mixing zone for mixing catalyst and synthesis gas. Fresh synthesis gas enters through line 27 and recycled synthesis gas enters through line 28. The two streams of synthesis gas are mixed in line 26 whence they flow upwardly into the vessel 10. At the top of the vessel 10, there is provided one or more cyclone separators 29 provided with a dip leg 30. Conduit 31 leads from the top of the vessel 10 to the catalyst recovery equipment shown in Figure 2. The catalyst recovery equipment is described in detail hereafter.

In operation, there is first established a dense fluidized catalyst bed above the tube sheet 13 under synthesis conditions. The catalyst may be blown into the apparatus by the synthesis gas through the conduit 26. The tube sheet 13 acts as an excellent distributor screen or grid for the fluidized catalyst so that no separate distributor is required. Water or other suitable heat transfer fluid is circulated in the shell 15 of the cooler around the tubes 12, the water being introduced through inlet 16 and removed in the form of steam through outlet 17, whence it passes to steam drum 67. A portion of the hot dense fluidized catalyst, having absorbed heat from the exothermic heat of reaction, settles from the catalyst bed into the reactivator 19 where it is contacted with hydrogen or a hydrogen-rich gas, such as a recycled hydrogen-rich gas from conduit 20. Contact of the hot catalyst with hydrogen serves to remove any waxy high molecular weight hydrocarbons which tend to form on the catalyst particles and which tend to cause agglomeration of the catalyst particles and destroy the fluidization thereof. The wax-free dense stream of fluidized catalyst then passes downwardly into the standpipe 18. An aerating gas, suitably a recycled hydrogen-rich gas, is admitted to the standpipe across the slide valve through a conduit 21 and the casing 22c of the slide valve. The aerating gas serves the purposes of maintaining the catalyst in the standpipe in fluidized condition, and aids in stripping reaction products from the catalyst particles. Within the standpipe 18, the catalyst stream is of a density greater than that in the catalyst bed, and accordingly, a pressure head is built up at the bottom of the standpipe sufficient to create a pressure drop across the slide valve below which the catalyst is in a dilute or less dense phase, as defined hereinabove. This causes the dense stream of fluidized catalyst to flow through the slide valve into the mixing zone and on to the upper cone of the deflector 25 where it is immediately diluted and made less dense by a stream of synthesis gas flowing through the conduit 26 and around the lower cone of the deflector 25. The velocity of the incoming synthesis gas is such as to transport all of the catalyst particles from the mixing zone into and through the tubes 12 of the cooler and into the catalyst bed. Upon passing through the tubes of the cooler, the dilute catalyst stream is cooled and gives up its heat to the cooling medium in the shell of the cooler. After passing through the cooler, the linear velocity of the synthesis gas drops because the cross-sectional area of the reaction zone is greater than that of the cooling tubes, whereupon the cooled less dense stream of catalyst returns to its former dense phase condition. The cooled catalyst stream rapidly mingles with the entire dense fluidized bed of catalyst by reason of the turbulence therein and serves to maintain the reaction temperature within the desired limits.

In the reaction zone, the synthesis gas is converted into hydrocarbons which, together with unreacted synthesis gas, flow upwardly out of the catalyst bed and into one or more cyclone separators 29. The cyclone separators serve the purpose of removing most of the entrained catalyst particles from the vaporous reaction products and gases. It is an advantage of this invention that the compact catalyst bed above the tubes and tube sheet 13 serves as an excellent filter, so that little catalyst is entrained and the number of cyclone separators required is reduced to a minimum. Other separators, such as electrostatic precipitators, filters and the like, may be employed instead of or in addition to the cyclone separators. The catalyst particles separated from the vaporous reaction products are returned to the catalyst bed through the dip leg 30 extending below the level of the bed.

From the cyclone separator, the reaction products and unreacted synthesis gas flow through a conduit 31 to the lower portion of a catalyst scrubber 32 for the purpose of removing any catalyst particles entrained in the vapors and gases leaving the cyclone separator. The catalyst scrubber comprises a vertical tower having inclined baffles 33 and horizontal baffles 34 of the well known "disc and donut" type. A heavy gas oil, condensed from the reaction products of the synthesis, is a suitable scrubbing medium. The heavy gas oil removes the catalyst particles contained in the vaporous reaction products and gases while flowing downwardly countercurrent thereto, and forms a slurry with the catalyst. Condensation of the gas oil results from cooling produced in slurry cooler 35. Heavy gas oil condensate and recovered catalyst are withdrawn from the bottom of catalyst scrubber 32 through line 36 by pump 37, a portion being returned to the reactor 10 through line 38, and the remainder going to the top of the scrubber through line 39 and slurry cooler 35. Heat is removed in the slurry cooler 35 by generating steam which flows through line 39a to steam drum 67. Water enters the slurry cooler through line 16a. A portion of the slurry is by-passed around cooler 35 through line 40 to maintain the desired temperature in the scrubber 32. Through proper control of the temperature in the top of scrubber 32 a substantially constant level is maintained in the bottom thereof, liquid neither building up nor boiling away.

The scrubbed vaporous reaction products and unreacted synthesis gas emerge from the scrubbing tower 32 through line 41. A portion of this effluent is diverted through line 42, compressed in compressor 43 to a pressure somewhat higher than that existing in the vessel 10, and passed into conduits 20 and 21, whence it flows as a reactivating gas for the reactivator 19, and as a reactivating and aerating gas in the stand-pipe 18.

The remaining portion of the scrubbed vapors and gases flow through conduit 44 to parallel heat exchangers 45 and 46, wherein they are partially cooled. Cooling water enters the heat exchangers through line 47 and is converted to steam which is withdrawn through line 48 to the steam drum 67. The partially cooled vapors and gases then pass through line 49 into parallel condensers 50, 51 and 52. Cooling water passes into the condensers through line 54 and is withdrawn through line 55. In the condensers, the condensible vaporous reaction products are condensed into normally liquid and solid products. The normally liquid products comprise a water phase and a hydrocarbon phase. The solid products comprise waxy high molecular weight hydrocarbons. Although the proportion of these waxy solids is small, a sufficient quantity solidifies in the condensers to reduce the heat transfer rates therein. Accordingly, as shown in the drawing, a fourth condenser 53 is provided. Three of the condensers are in service while the fourth is being steamed to remove the solidified wax. For this purpose, low pressure steam is admitted to the condenser not in service through line 56, and wax, steam and steam condensate are removed through drain line 57. The heat exchangers 45 and 46 and the condensers 50, 51, 52 and 53 are manifolded to water, steam and drain lines along with appropriate valving, as will be apparent to one skilled in the art.

From the condensers, the liquid condensates, normally gaseous reaction products and unreacted synthesis gas pass through line 58 into a flash drum 59, wherein the gases are separated from the liquids. The flash drum is provided with a horizontal baffle 60 and a downcomer 61 in order that the condensed water and hydrocarbon phases will be fed to a quiescent settling zone in the bottom of the drum. The downcomer 61 extends to about the level of the interface (shown by the dotted line) between the lower settled water phase and the upper settled hydrocarbon phase. The upper hydrocarbon phase is withdrawn from the flash drum through line 63 whence it is passed to suitable product recovery equipment (not shown) to fractionate the hydrocarbons into products such as gasoline, kerosene, Diesel fuel, gas oils, and the like. The lower water phase is withdrawn from the flash drum through line 62 to other product recovery equipment (not shown) wherein oxygenated by-products, such as alcohols, are recovered. The gases separated in the flash drum are withdrawn through line 64. These gases contain some unreacted synthesis gas, normally gaseous hydrocarbons and a small proportion of vapors of low-boiling normally liquid hydrocarbons. A portion of the gases from line 64 are passed through line 66 to compressor 70, where they are compressed and passed through line 28 and conduit 26 to serve as recycled synthesis gas. The remaining portion of the gases from line 64 are withdrawn through line 65 to suitable product recovery equipment.

High pressure steam is obtained in the steam drum 67, whence it may be withdrawn through line 69 for use in the plant. Steam condensate is withdrawn from the steam drum through line 68, whence it passes as cooling water through line 47 to the heat exchangers 45 and 46, through line 16 to the reactor cooler and through line 16a to slurry cooler 35.

In lieu of using a slide valve to control the flow of catalyst, an orifice of fixed dimensions, may be employed at the bottom of the standpipe 18. In such case, the synthesis gas feed is split and is fed not only through conduit 26, but also to the catalyst bed at a point or points just above the tube sheet 13. The rates of gas flow to the catalyst bed and to the conduit 26 are adjusted to provide a dense fluidized catalyst bed above the tube sheet 13, and a dilute catalyst suspension in the mixing zone in the conical portion 11 of the reactor. Increasing the rate of flow of the synthesis gas to the catalyst bed, and decreasing the rate of flow of the synthesis gas to the mixing zone serve to decrease the amount of catalyst withdrawn from the standpipe and passing through the cooling tubes. This would be employed to increase the temperature in the catalyst bed. Conversely, if it were desired to decrease the temperature in the catalyst bed, the rate of flow of synthesis gas to the catalyst bed would be decreased, and the rate of flow of synthesis gas to the mixing zone would be increased, thereby increasing the amount of catalyst withdrawn from the standpipe and passing through the cooling tubes. Suitable automatic controls, responsive to the temperature in the catalyst bed, may be employed automatically to proportion the flow of the synthesis gas above and below the catalyst bed.

While the dimensions of my apparatus and the reaction conditions may vary widely depending upon the particular chemical reaction carried out and the reaction conditions pertaining thereto, the following dimensions and conditions, pertaining to the vessel 10, for synthesizing gasoline hydrocarbons from carbon monoxide and hydrogen are given by way of example. For this synthesis, a reduced iron oxide having a particle size of about 65-140 mesh and a settled bulk density of 128 pounds per cubic foot may be employed. If desired, promoted catalysts, such as catalysts promoted with alumina, may be used.

The pressure within the apparatus above the catalyst bed is maintained at about 150 pounds per square inch gauge, the temperature in the catalyst bed is maintained at about 600° F., and the space velocity, that is, volumes of fresh synthesis gas per volume of settled catalyst per hour is about 3000. With an internal diameter of the vertical cylindrical vessel 10 of about 12 feet, the overall height of the vessel 10 may be about 38 feet. The height of the conical portion 11 may be about 10 feet, and the distance of the cooler between tube sheets 13 and 14 may be about 12 feet. The depth of the catalyst bed is about 6 feet, and the rate of catalyst circulation is about 4,220,000 pounds per hour. The total amount of catalyst in the vessel 10 is about 87,500 pounds of which 46,900 pounds are maintained in the catalyst bed. The linear velocity of the synthesis gas through the catalyst bed may vary from about 0.6 to 2.2 feet per second, depending upon the recycle ratio of recycled synthesis gas to fresh synthesis gas. For a recycle ratio of 2:1, the linear velocity of the synthesis gas through the catalyst bed is about 1.2 feet per second. Under these conditions, the density of the dense fluidized catalyst bed is about 73 pounds per cubic foot. The linear gas velocity of the synthesis gas passing through the cooling tubes 12 is 10 feet per second, and the density of the less dense or dilute stream of fluidized catalyst passing therethrough may be about 15 pounds per cubic foot. The cylindrical portion of the reactivator may be 5 feet in diameter and 2 feet high. The conical portion of the reactivator has an angle of 60° from the horizontal. The internal diameter of the standpipe is 2.5 feet and the height of the standpipe from the slide valve to the tube sheet 13 is 16 feet. Under these conditions the pressure drop across the slide valve is about 8.5 pounds per square inch, which is ample to control circulation of the catalyst. The standpipe extends into the conical portion 11 of the vessel for a distance of about 4 feet below tube sheet 14. The pressure drop across the vessel 10 from the inlet conduit 26 to a point just above the catalyst bed is about 8 pounds per square inch. Accordingly, the synthesis gas is introduced to the inlet conduit 26 at a pressure of 158 pounds per square inch gauge. The mol ratio of hydrogen to carbon monoxide in the fresh synthesis gas is 2:1, and in the recycled synthesis gas, about 7:1. The fresh synthesis gas is introduced into the conduit 26 at a temperature of 100° F. and at a rate of 1,100,000 standard cubic feet per hour. The recycled synthesis gas has been cooled to a temperature of about 180° F. prior to being introduced into the conduit 26 and enters at a rate of 2,200,000 standard cubic feet per hour. Recycled hydrogen-rich gas from the catalyst scrubber enters the reactivator 19 at a rate of 109,000 standard cubic feet per hour, a pressure of about 164 p. s. i. g., and a temperature of about 578° F., and the bottom of the standpipe, as an aerating gas, at a rate of 199,000 standard cubic feet per hour at a the same temperature and pressure. Cooling tubes having an internal diameter of one inch may be employed and sufficient cooling tubes are mounted in the tube sheets to give a cooling surface of about 9050 square feet. With cooling water entering the inlet 16 at 100° F., steam issues from outlet 17 at a pressure of 155 pounds per square inch gauge and a temperature of about 368° F.

While the above description indicates the use of an iron synthesis catalyst, other catalysts for the synthesis of hydrocarbons from carbon monoxide and hydrogen, such as cobalt, nickel, etc., may be employed. The catalyst may be promoted or unpromoted, or supported on diatomaceous earth or other inert supports, or unsupported, as desired. The catalysts for accomplishing the hydrocarbon synthesis are well known in the art and need no further description here. The particular reaction conditions may also be varied in a manner known to the art.

The primary advantage of my invention is the ease with which the reaction temperature of chemical reactions may be controlled. An additional advantage is the continuous reactivation of the catalyst in the hydrocarbon synthesis to remove waxy products without interrupting the reaction. Furthermore, the internal standpipe eliminates the need for a catalyst riser line and its accompanying bends, so that the apparatus is more compact and erosion is minimized. In the case of an exothermic reaction, cooling of the catalyst in the dilute phase eliminates the need for bulky cooling equipment and accomplishes a more efficient cooling. Since all of the equipment is within the shell of the cylindrical vessel, only the shell need be constructed to withstand full operating pressure.

The continuous reactivation of catalyst is a particularly advantageous feature of my invention. As is well known to those familiar with the hydrocarbon synthesis art, synthesis catalysts, particularly iron, are very susceptible to disintegration after continued use. This appears to be due to the deposition of carbon in the interstices of the metal crystals from the decomposition of the high molecular weight hydrocarbons formed in the reaction. By continuously stripping off heavy hydrocarbons from the catalyst with hydrogen, the tendency for catalyst disintegration is reduced. Since the amount of waxy high molecular weight hydrocarbons deposited on the catalyst varies with various reaction conditions and catalyst compositions, the degree of hydrogen treatment required may be varied by varying the temperature and amount of the hydrogen treating gas.

While my invention has been particularly described with respect to the synthesis of hydrocarbons from carbon monoxide and hydrogen, it is not to be limited thereto since it is applicable to other exothermic and endothermic chemical reactions, wherein a finely divided catalyst is maintained in suspension in reactant gases in a dense fluidized bed in a reaction zone, and where close temperature control is important. For example, the method and apparatus of my invention may be applied to the following exothermic reactions: polymerization of olefinic hydrocarbons, demethylation of hydrocarbons, and the hydrogenation of gaseous or vaporous hydrocarbons in the presence of a powdered hydrogenation catalyst. On the other hand, by using a heating fluid instead of a cooling fluid in the shell of the cooler in the vessel 10, it is possible to supply heat and thus control the temperature in carrying out endothermic reactions. Obviously, the specific reaction conditions employed will vary with the particular reaction that is conducted. If it is not necessary to reactivate the catalyst, treatment thereof with a reactivating gas may be omitted without departing from the spirit of my invention.

As used in the appended claims, the term "gaseous reaction product" includes vapors of normally liquid or solid reaction products, as well as normally gaseous reaction products and unreacted reactant gases.

I claim:

1. Apparatus for conducting chemical reactions in the prescence of a powdered catalyst comprising a closed cylindrical vessel, an inlet conduit at the bottom of said vessel, an outlet conduit at the top of said vessel, a tubular heat exchanger within said vessel and adapted to distribute powdered catalyst into a dense fluidized bed of catalyst above said heat exchanger, a small open vessel disposed within said closed cylindrical vessel above said heat exchanger and below the level normally occupied by the surface of the catalyst bed, means for introducing a reactivating gas to said small open vessel, a standpipe disposed within said closed cylindrical vessel, surrounded by the tubular heat exchanger and communicating with the small open vessel, a slide valve in the bottom of said standpipe, means for actuating said slide valve in response to the temperature in the catalyst bed, and deflecting means below said slide valve for deflecting reactant gases entering from said inlet conduit into the catalyst after said catalyst has passed through said slide valve.

2. The process of manufacturing hydrocarbons from a synthesis gas mixture containing carbon monoxide and hydrogen wherein a finely divided synthesis catalyst is contacted with the synthesis gas mixture while in fluidized state, said process being carried out in a closed process zone containing an upper reaction zone, an intermediate cooling zone, a lower mixing zone, a catalyst reactivation zone disposed centrally of, surrounded by, and communicating with said reaction zone, and a conduit zone leading from said reactivation zone to said mixing zone and passing centrally through said cooling zone, said process comprising maintaining in said reaction zone a suspension of the synthesis catalyst in synthesis gas in dense fluidized state under synthesis conditions of temperature and pressure, continuously passing the synthesis catalyst in fluidized condition from said reaction zone to said reactivation zone, removing high molecular weight reaction products from the catalyst particles in said reactivation zone by contacting the synthesis catalyst with a gas rich in hydrogen, withdrawing the synthesis catalyst in a fluidized condition from the reactivation zone downwardly through said conduit zone to said mixing zone, mixing the catalyst with synthesis gas in the mixing zone to form a dilute mixture of synthesis catalyst and then passing said dilute mixture upwardly through said cooling zone in a plurality of confined streams into the bottom of said reaction zone to form the dense fluidized bed of synthesis catalyst in said reaction zone.

3. The process of manufacturing hydrocarbons from a synthesis gas mixture containing carbon monoxide and hydrogen wherein a finely divided synthesis catalyst is contacted with the synthesis gas mixture while in fluidized state, said process being carried out in a closed process zone containing an upper reaction zone, an intermediate cooling zone, a lower mixing zone, a catalyst reactivation zone disposed centrally of, surrounded by, and communicating with said reaction zone, and a conduit zone leading from said reactivation zone to said mixing zone and passing centrally through said cooling zone, said process comprising maintaining in said reaction zone a suspension of the synthesis catalyst in synthesis gas in dense fluidized state under synthesis conditions of temperature and pressure, continuously passing the synthesis catalyst in fluidized condition from said reaction zone to said reactivation zone, removing high molecular weight reaction products from the synthesis catalyst in said reactivation zone by contacting the synthesis catalyst with a gas rich in hydrogen, withdrawing synthesis catalyst in fluidized condition from the reactivation zone downwardly through said conduit zone to said mixing zone, then mixing the synthesis catalyst with synthesis gas in the mixing zone to form a dilute mixture of synthesis catalyst, passing said dilute mixture upwardly through said cooling zone in a plurality of confined streams into the bottom of said reaction zone to form the dense fluidized bed of synthesis catalyst in said reaction zone, and controlling the temperature in said reaction zone by controlling the amount of synthesis catalyst flowing through said cooling zone.

4. Apparatus for conducting chemical reactions in the presence of a finely divided catalyst, comprising a closed cylindrical vessel; an inlet conduit at the bottom of said vessel; an outlet conduit at the top of said vessel; a tubular heat exchanger within said vessel comprising an upper tube sheet displaced from the top of said cylindrical vessel, a lower tube sheet displaced from the bottom of said cylindrical vessel, and a plurality of vertical transfer tubes terminating in said upper and lower tube sheets; a standpipe disposed centrally of and passing through said tubular heat exchanger; a small open vessel positioned above and communicating with said standpipe; said standpipe being adapted to conduct catalyst from said small open vessel to below said lower tube sheet of said tubular heat exchanger; said upper tube sheet of said tubular heat exchanger forming with the upper portion of the walls of said cylindrical vessel and the exterior surface of said small open vessel a reaction chamber having a horizontal cross-sectional area greater than the total horizontal cross-sectional area of said transfer tubes; means for introducing gas into said small open vessel; a valve in the bottom of said standpipe; means for actuating said valve in response to temperature variations in said reaction chamber; and deflecting means below said valve for deflecting reactant gases entering from said inlet conduit into the catalyst after said catalyst has passed through said valve.

JOEL H. HIRSCH.

REFERENCES CITED

The following references are of record in the file of this patent:

UNITED STATES PATENTS

| Number | Name | Date |
|---|---|---|
| 2,347,682 | Gunness | May 2, 1944 |
| 2,360,787 | Murphree et al. | Oct. 17, 1944 |
| 2,373,008 | Becker | Apr. 3, 1945 |
| 2,378,342 | Voorhees et al. | June 12, 1945 |
| 2,383,636 | Wurth | Aug. 28, 1945 |
| 2,386,491 | McOmie | Oct. 9, 1945 |
| 2,386,681 | Hadden | Oct. 9, 1945 |
| 2,409,353 | Giuliani | Oct. 15, 1946 |
| 2,418,003 | Angell | Mar. 25, 1947 |
| 2,436,568 | Griffin et al. | Feb. 24, 1948 |
| 2,438,728 | Tyson | Mar. 30, 1948 |
| 2,447,505 | Johnson | Aug. 24, 1948 |
| 2,451,879 | Scharmann | Oct. 19, 1948 |